United States Patent [19]

Ryham et al.

[11] Patent Number: 5,326,433
[45] Date of Patent: Jul. 5, 1994

[54] MULTI-LEVEL SULFIDE CONTENT WHITE LIQUOR PRODUCTION AND UTILIZATION IN CELLULOSE PULPING

[75] Inventors: Rolf Ryham, Roswell, Ga.; James W. Smith, Toronto, Canada; Jian E. Jiang, Glens Falls, N.Y.; Kaj Henricson, Kotka, Finland

[73] Assignee: Ahlstrom Recovery Inc., Roswell, Ga.

[21] Appl. No.: 887,004

[22] Filed: May 22, 1992

Related U.S. Application Data

[63] Continuation-in-part of Ser. No. 651,462, Feb. 6, 1991, abandoned, and a continuation-in-part of Ser. No. 840,080, Feb. 21, 1992, and a continuation-in-part of Ser. No. 788,151, Nov. 5, 1991, abandoned.

[30] Foreign Application Priority Data

May 24, 1991 [GB] United Kingdom .............. 9111256

[51] Int. Cl.$^5$ ............................................. D21C 11/00
[52] U.S. Cl. ..................... 162/14; 162/16; 162/19; 162/29; 162/30.11; 423/DIG. 3
[58] Field of Search ............. 162/30.1, 30.11, 82, 162/84, 86, 16, 14; 423/206 R, 207, 228, 563, DIG. 3; 208/209; 585/733

[56] References Cited

U.S. PATENT DOCUMENTS

| 2,711,430 | 6/1955 | Hagglund et al. | 568/60 |
|---|---|---|---|
| 3,607,619 | 9/1971 | Hess et al. | 162/30 |
| 3,762,989 | 10/1973 | Timpe | 162/16 |
| 3,841,962 | 10/1974 | Procter et al. | 162/30 |
| 4,113,553 | 9/1978 | Samuelson | 162/34 |
| 4,373,109 | 2/1983 | Olah | 585/640 |
| 4,872,950 | 10/1989 | Andersson et al. | 162/30.1 |
| 4,919,914 | 4/1990 | Smith et al. | 423/576.2 |
| 4,929,307 | 5/1990 | Kiiskila et al. | 162/30.11 |
| 4,953,607 | 9/1990 | Erkki et al. | 159/13.3 |
| 5,053,108 | 10/1991 | Richter | 162/237 |
| 5,080,756 | 1/1992 | Kutney | 162/30 |

FOREIGN PATENT DOCUMENTS

| 873234 | 6/1971 | Canada . |
|---|---|---|
| 2046545-0 | 1/1992 | Canada . |
| WO91/08337 | 6/1991 | PCT Int'l Appl. . |
| 8802129-0 | 8/1988 | Sweden . |

OTHER PUBLICATIONS

Fogman, "The Lummus Pollution-Controlled Polysulfide Recovery Process," 1972 Alkaline Pulping Conf., Sep. 1972, pp. 1-11.
Johansson et al., "Modified Continuous Kraft Pulping--Now A Reality," Svensk Paperstidning No. 10, 1984, pp. 30-35.
Andrews et al, "Extended Delignification Kraft Pulping of Softwood . . . ", Journal of Wood Chemistry and Technology, 5(4), 431-450 (1985).
International Technology Disclosures, vol. 5, No. 11, Nov. 25, 1987 "Residual Material" and Extended Delignification/Modified Cooking of Paper Pulp.
Tappi Journal, May, 1989 "New Findings on Sulfide Chemistry in Kraft Pulping Liquors", Tormund et al, pp. 205-210.
Tappi Journal, Jul., 1979 vol. 62, No. 7, "Modified Kraft Processes for Softwood Bleached-Grade Pulp", Norden et al, pp. 49-51.

Primary Examiner—W. Gary Jones
Assistant Examiner—Dean T. Nguyen
Attorney, Agent, or Firm—Nixon & Vanderhye

[57] ABSTRACT

Paper pulp (e.g. kraft pulp) is produced utilizing at least two different supplies of cooking liquor, one having low sulfide content, and the other high sulfide content. The high sulfide content supply is typically used to impregnate the pulp or otherwise treat it first, while the second supply is used in other cooking stages (e.g. a digester), whether co-current or countercurrent. The different sulfur content liquors are obtained by heat treating (under pressure) black liquor to drive off sulfur compounds, and absorbing them into white liquor to produce a high sulfide stream. The low sulfide stream is made by conventional treatment of the black liquor after heat treating and evaporation. Utilizing multiple sulfide content supplies results in an optimum viscosity/kappa ratio and/or pulp strength properties for the pulp produced.

4 Claims, 4 Drawing Sheets

MULTI-LEVEL SULFIDE CONTENT WHITE LIQUOR PRODUCTION AND UTILIZATION IN CELLULOSE PULPING

CROSS-REFERENCE TO RELATED APPLICATIONS

This application is a continuation-in-part of each of the following applications: Ser. No. 07/651,462 filed Feb. 6, 1991, now abandoned, Ser. No. 07/840,080 filed Feb. 21, 1992, pending and Ser. No. 07/788,151 filed Nov. 5, 1991, abandoned.

BACKGROUND AND SUMMARY OF THE INVENTION

For many years it has been known that a higher sulfide concentration in white liquor for kraft pulping in the pulp and paper industry (i.e. higher white liquor sulfur content) could produce kraft pulp with higher viscosity and better physical properties. It has also been known that the beneficial effect of higher white liquor sulfur content is more profound in the early stages of the kraft cook than in the later stages. However in the past there have been a number of technical and practical concerns and conditions which have precluded practical utilization of these concepts.

According to the present invention, it has been found that by treating the black liquor from the kraft pulping process in a particular way, it is possible to make two (or more) different sulfur content white liquor streams in a practical manner, and to use those plural streams in the production of kraft pulp. The manner in which the streams are produced, the source of sulfur for the streams, and the manner in which the streams are utilized are all distinct from earlier practices in the art, and result in significant advantages in the pulping process.

According to the invention, at least two different streams of white liquor having vastly different sulfur content are produced. According to the preferred method, the stream with the higher sulfur content is used to treat the slurry of comminuted cellulose (e.g. wood chips) used for the production of pulp first (e.g. in an impregnation stage), and then the stream with lower sulfur content, without lowering pulping selectivity. This allows one to improve sulfate pulping without changing the total overall sulfidity (that is without required significant additional sulfide, apart from what is already in the recirculated and recycled liquids and other substances) of the mill (i.e. without changing the overall sulfur balance).

Under some circumstances, according to the invention it is possible to treat the comminuted material with the low sulfur content white liquor first, and then the high sulfur content material, but this is not normally preferred.

The desired results according to the invention can be achieved in a practical manner by pressure heating the black liquor withdrawn from a continuous or batch kraft process, at a temperature and for a time period such that substantial volumes of off gases containing organic sulfur compounds are produced; treating the black liquor by incineration and recaustization to recover chemicals from them and utilizing the chemicals in the manufacture of the low sulfur stream of white liquor; treating the off gases to produce primarily hydrogen sulfide and methane; and absorbing the hydrogen sulfide into a stream of cooking liquor to produce the high sulfur content stream of cooking liquor (e.g. white liquor).

According to the most specific aspects of the present invention, the concepts described above are utilized in a practical manner to provide kraft pulp that has an optimum viscosity/kappa ratio, and/or good strength properties, and good yield. The invention is applicable to a wide variety of different kraft cooking processes, both batch and continuous. For example, the invention can be utilized in continuous digesters having an impregnation zone, or in cooking systems utilizing a separate impregnation vessel from the continuous digester, or in batch digesters. The invention can also be utilized in association with co-current movements of white liquor (or other cooking liquor) with the pulp, or countercurrent movements, such as are provided in the commercial digesting process marketed by Kamyr, Inc. of Glens Falls, N.Y. under the trademarks "MCC" and "EMCC".

White liquor is that treatment liquid in a kraft process which contains the active cooking chemicals, sodium hydroxide (NaOH) and sodium sulfide ($Na_2S$); or white liquor in an extreme situation may contain substantially only NaOH as the active ingredient; i.e. the term "white liquor" as used in the present specification and claims includes fresh sodium hydroxide. According to standard practice, the white liquor cooking sulfidity is maintained in the range of 25-45% (this overall sulfur content ratio is the amount of sodium sulfide to the sum of sodium sulfide and sodium hydroxide, expressed as sodium oxide, applied to the whole cooking process), and according to standard practice in the art, a sulfur content level below 15% results in a deterioration in the cooking rate and pulp quality. During the production of kraft pulp, residual or "black liquor" containing the reaction products of lignin solublization is withdrawn from the digester, concentrated, and burned in a recovery furnace to yield an inorganic smelt of sodium carbonate and sodium sulfide. The smelt is dissolved to form green liquor which is reacted with quick lime (CaO) to convert the sodium carbonate into sodium hydroxide and thereby regenerate the original white liquor.

According to the present invention, it has been found that by making two (or more) supplies or streams of white liquor, with different sulfur contents, and applying them to different portions in the kraft cycle, significantly improved results can be achieved. In fact it has been found that it is highly desirable to add the majority of the sulfide in the total white liquor (total cooking chemical) —at least about 60-90%, in fact even almost all the sulfide—at the initial stages (e.g. impregnation) of the kraft cycle, while adding white liquor with primarily only sodium hydroxide at the later stages (e.g. co-current or countercurrent cooks). Practicing the invention, it is possible to optimize the viscosity/kappa ratio of the produced pulp for any given level of sulfur content, and/or to optimize pulp strength properties. The increase can be dramatic, easily on the order of 25% for conventional cooks with multiple white liquor additions (co-current), about the same increase for modified continuous cooking (MCC TM), and 15% or more for extended modified continuous cooking (EMCC TM), without a significant change in the mill sulfur balance (i.e. amount of total sulfur utilized). Comparable increases occur for batch treatment too.

One aspect of the present invention is a method of producing chemical pulp: (a) Intentionally removing sulfur from a fluid containing sulfur. (b) Including by using removed sulfur from step (a), making at least two streams of white liquor, including a second stream having relatively low sulfur content, and a first stream having relatively high sulfur content, substantially higher than the sulfur content of the second stream. (c) Chemical pulping cellulose material utilizing the first and second streams of white liquor, added at different places in the pulping process. And, (d) washing the chemical pulp produced.

According to another specific aspect of the present invention there is provided a method of producing kraft pulp comprising the following steps: (a) Treating a slurry of cellulosic fibrous material in a plurality of consecutive stages with white liquor, including at least first and second stages, using a first supply of white liquor to the one stage and a second supply to another stage. (b) Subjecting the material treated with white liquor to cooking conditions in at least one stage of the stages to effect kraft cooking thereof, and producing black liquor. (c) Producing the second supply of white liquor, and separately recovering sulfur from the black liquor. And, (d) adding the recovered sulfur to the first supply of white liquor to significantly increase the sulfur content thereof so that it is greater than the sulfur content of the second supply. The first supply is preferably added to the first stage, and the second supply to the second stage.

According to still another specific aspect of the present invention there is provided a method of producing kraft pulp comprising the steps of: (a) Treating cellulosic comminuted fibrous material in a first stage with a first supply of white liquor. (b) Treating the material in a second stage with a second supply of white liquor. And, (c) controlling the relative sulfur contents of the first and second supplies of white liquor so as to optimize the viscosity/kappa ratio and/or physical strength properties of the kraft pulp produced.

While the invention will primarily be described in this application with respect to kraft cooking, there is a broader aspect of the present invention. According to the broadest aspect of the present invention, any lignin reaction enhancing or carbohydrate degradation slowing chemicals are targeted to one or more specific parts of the cook, such as the impregnation, co-current, or countercurrent stages. Thus the invention is applicable not just to kraft white liquor, but to sulfite process cooking liquors (containing a cationic base), anthraquinone, derivatives of or equivalents to anthraquinone, or the like. The anthraquinone may replace all or some of the sodium sulfide in a cooking liquor containing NaOH, or may be used in other liquor compositions, and polysulfide may also be utilized.

According to the broadest aspect of the present invention, a method of treating comminuted cellulosic fibrous material with cooking liquor to obtain cellulosic pulp, is provided. The method comprises the following steps: (a) Providing at least first and second cooking liquors, including a first cooking liquor having a first concentration of lignin reaction enhancing or carbohydrate degradation slowing chemical, and a second cooking liquor having a second concentration of that lignin reaction enhancing or carbohydrate degradation slowing chemical, the second concentration being from zero to much less than the first concentration. (b) Cooking the comminuted cellulosic fibrous material in several cook stages. (c) Targeting the first cooking liquor to one or more, but less than all, of the cook stages, to provide cooking liquor for one or more stages; and (d) utilizing the second cooking liquor in at least one cook stage in which the first cooking liquor is not utilized.

The cooking liquor utilized above may be a kraft cooking liquor, sulfite cooking liquor, or the like. It may contain a cationic base, sodium sulfide, anthraquinone or its derivatives or equivalents, or the like, and the first liquor may be targeted to an impregnation stage, co-current cook stage, or countercurrent cook stage.

It is the primary object of the present invention to provide a substantially improved cook cycle for the production of paper pulp, and a particular way of obtaining sulfur recovery for the production of different sulfur content white liquor streams in a practical manner. This and other objects of the invention will become clear from an inspection of the detailed description of the invention, and from the appended claims.

DETAILED DESCRIPTION OF THE DRAWING

Figure 1:
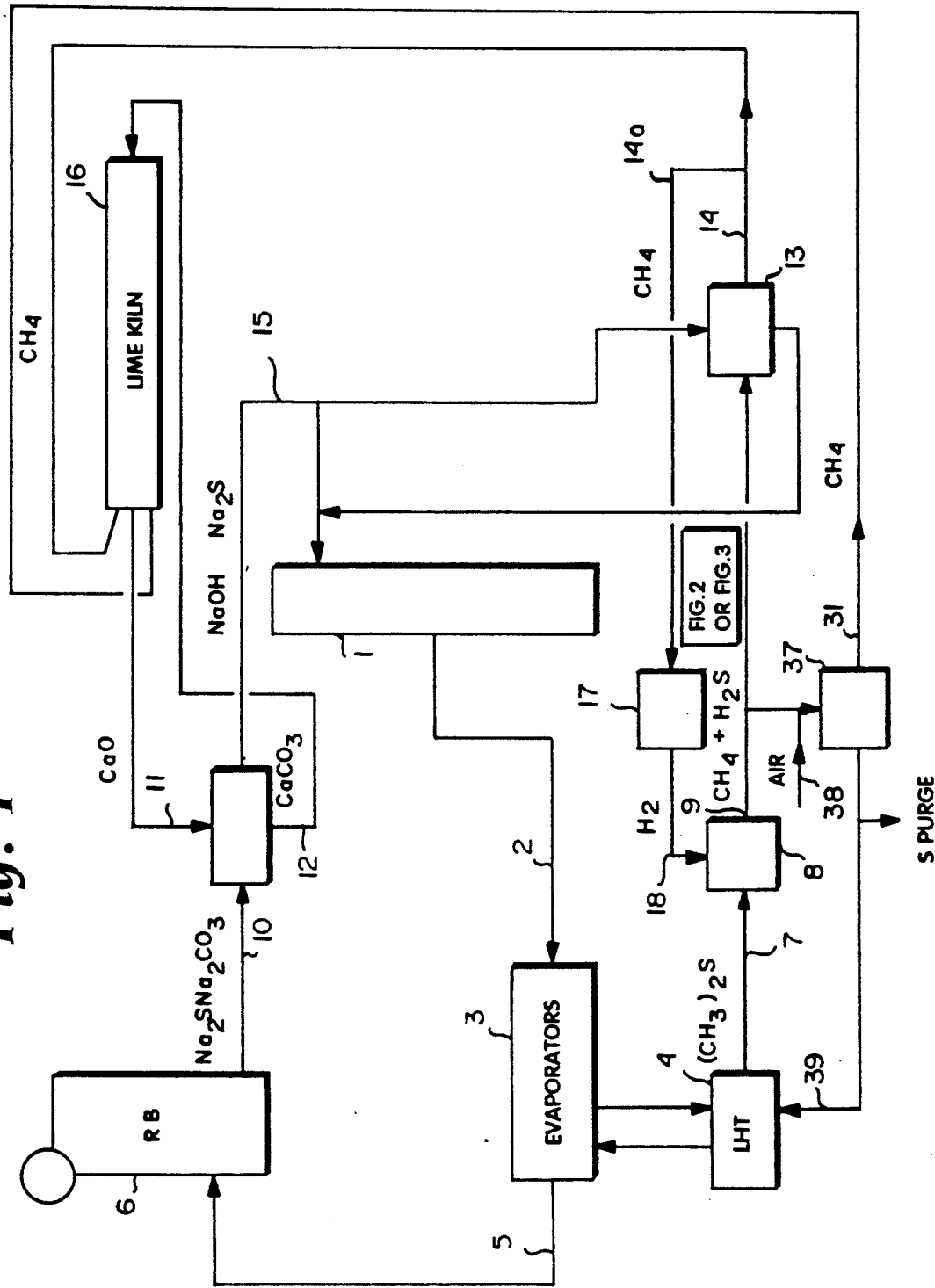
FIG. 1 is a schematic diagram illustrating apparatus for practicing a method of recovering sulfur from black liquor in order to facilitate the production of different sulfur content streams of white liquor.

In FIG. 1 the weak black liquor is fed from a digester house 1 through line 2 and is evaporated in, for instance, a multiple effect evaporating system 3 in accordance with U.S. Pat. No. 4,953,607 the disclosure of which is hereby incorporated by reference herein. The lignin in the liquor to be evaporated is split by a heat treatment, that is by heating the black liquor under pressure for a predetermined time, in a reactor vessel 4 (e.g. see U.S. Pat. No. 4,929,307), whereby gases containing organic sulfur compounds are generated. At temperatures over 200° C. the amount of sulfur exiting can be controlled to be a particular percentage of all sulfur contained in the black liquor.

The heat treatment in vessel 4 is carried out under superatmospheric pressure, e.g. at pressures varying from about 8 bars to 165 bars, preferably from about 12 bars to 80 bars. Suitable temperatures for the heat treatment range from about 170°–350° C. and preferably from 190°–290° C. At these temperatures substantially all of the organic sulfur compounds, which are formed in the black liquor during the heat treatment, are liberated in form of gas. For example, at a temperature of 280° C. this gas contains about 65% dimethyl sulfide, about 34% methyl mercaptan and 1% hydrogen sulfide. The objective of the pressure heating is, on one hand, to decrease the viscosity of the black liquor to be concentrated thereby improving the evaporation and treatment abilities of the liquor, and, on the other hand, to remove sulfur therefrom. The heat treatment causes the splitting of mainly the polysaccharides in the black liquor, which, in turn, results in a decrease of the viscosity thereof. At the same time methoxy groups of lignin split off and react with the sulfur, thereby generating dimethyl sulfide (DMS).

The concentrated black liquor the sulfur content of which is decreased is transferred through line 5 to a soda recovery boiler (e.g. kraft chemical recovery boiler) 6 for combustion therein. The chemical melt thus produced and mainly containing $Na_2S$ and $NaCO_3$ is dissolved in water, whereby green liquor in line 10 is generated. The green liquor is thereafter causticized in a suitable vessel with lime (CaO) added through line 11 to form white liquor exiting through line 15, and which is transferred to the digester 1 or for further treatment. The lime mud also formed during the causticizing step is fed through line 12 into a lime kiln to be calcined therein to recover the lime therefrom.

Organic sulfur compounds, such as dimethyl sulfide (DMS) formed during the above described heat treatment of the black liquor in reactor vessel 4 is fed through line 7 into hydroconverter 8 and reduced therein to methane and hydrogen sulfide. This reduction of DMS is achieved with $H_2$, or $CO+H_2$, (preferably with only $H_2$) at a temperature of about 300° C. $H_2S$ can be separated from the gas mixture ($CH_4$ and $H_2S$) contained in line 9 by absorption thereof in a white liquor scrubber 13, whereby a substantially sulfur-free $CH_4$ gas is produced. $H_2S$ reacts with NaOH as follows: $2CH_4+H_2S+2NaOH \rightarrow Na_2S+2CH_4+2H_2O$. The white liquor added through line 15 also absorbs the sulfur compounds in scrubber 13 which liquor can thereafter be returned to the digester 1 to increase the sulfidity and thus improve the pulp yield and pulp quality. It is possible to decrease the Kappa number at least by 4. Preferably, multiple content white liquor streams are produced, as described more fully hereafter.

A portion of the methane gas is fed through line 14 to a lime kiln 16 to substitute for the fuel normally used therein. Another portion of the methane is fed through line 14a, after the white liquor scrubber, to a converter 17 and is converted therein to carbon monoxide and hydrogen through sub-stoichiometric combustion, which is a conventional method. The hydrogen and carbon monoxide 18 are fed to hydroconverter 8 to be used therein to reduce the dimethyl sulfide to methane and hydrogen sulfide.

Figure 2:
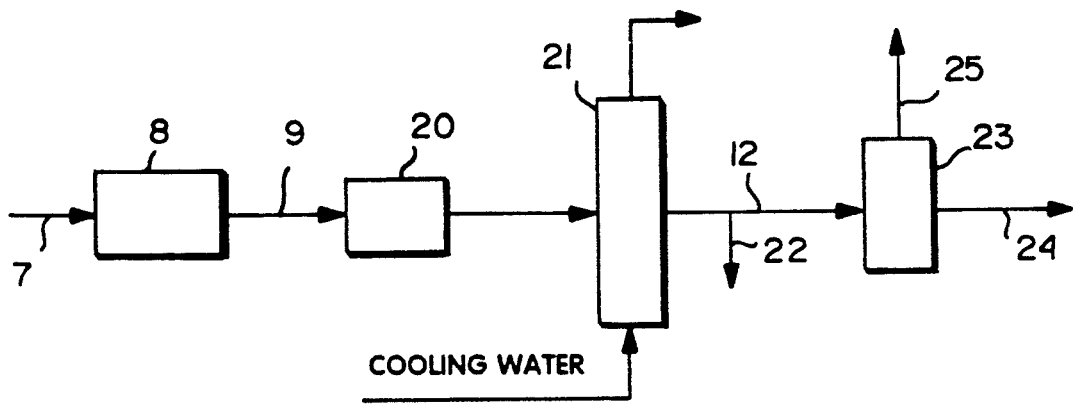
FIG. 2 is a diagram illustrating an exemplary method of separating hydrogen sulfide from methane in the method of FIG. 1.

Alternatively to absorbing the hydrogen sulfide as described, the $H_2S$ can also be separated by compression and partial condensation as illustrated in FIG. 2. The gas mixture containing methane and hydrogen sulfide is compressed in a pressure apparatus 20 to a pressure of at least 20 bar and partially condensed in condenser 21 so that most of the hydrogen sulfide 22 is separated from the methane. The produced $H_2S$ existing therefrom through line 22 can be used in the pulping process to considerably improve the pulping yield by pre-impregnating the wood chips with $H_2S$ before the alkaline delignification process. The production increase based on fiber production is at least 10–12%. The remainder of the gas mixture is transferred through line 12 to an absorber 23 and absorbed therein using methanol as an absorbent, thereby separating the remaining hydrogen sulfide from the methane. The free methane gas in line 25 can then be used in the lime kiln as a fuel as described above.

Figure 3:
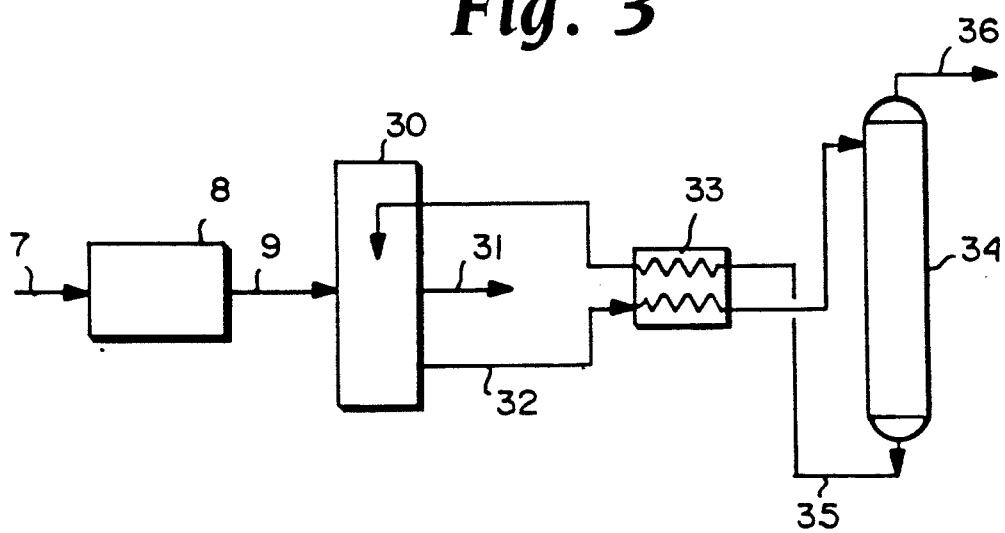
FIG. 3 is another schematic of an alternative method of separating hydrogen sulfide from methane in the method of FIG. 1.

Alternatively the gas mixture containing methane and hydrogen sulfide after the hydrogen converter 8 can also be treated by absorption as follows. The hydrogen sulfide is separated from the methane by absorbing it into an amine solution containing methanolamine in an amine scrubber 30 as illustrated in FIG. 3. The methane exiting from the scrubber is transferred through line 31 to the lime kiln 16 to be used as a fuel. The amine solution containing the hydrogen sulfide is transferred through line 32 to an amine stripper 34, wherein the hydrogen sulfide is separated by the addition of stream. The amine solution in line 35 which is free from $H_2S$ is fed back to scrubber 30 through a heat exchanger 33, in which the solution coming from the scrubber is preheated. The hydrogen sulfide exiting from the stripper 34 through line 36 can be utilized as described earlier.

Further, a part or the entire flow of hydrogen sulfide can be oxidized to elementary sulfur according to processes similar to the Claus process, or through the method described in U.S. Pat. No. 4,919,914 which is also incorporated by reference herein. Also the gas mixture in line 9 after the hydroconverter 8 can be treated by this method. This method is based on the principle of using Fe as a catalyst to convert $H_2S$ to S and $H_2O$ in a flotation cell. The hydrogen sulfide containing gas stream in line 9 (FIG. 1) is continuously fed to a reaction zone in an agitated flotation cell 37 which contains an aqueous medium and as a hydrogen sulfide oxidizing catalyst, chelatic ferric hydroxide dissolved in the aqueous medium. A separate oxygen containing gas stream, usually air is continuously fed through line 38 to the reaction medium. The process proceeds according to the reaction: $H_2S + \frac{1}{2}O_2 \rightarrow H_2O + S$. The sulfur particles which are formed in the oxidation reaction are continuously transported to the surface of the aqueous medium from which the sulfur can easily be recovered. The sulfur formed is fed back through line 39 to the heat treatment reactor 4 to enhance the formation of new dimethyl sulfide or is withdrawn from the system as crystalline sulfur. If the gas mixture contains methane, the methane is separated therefrom and transferred to the lime kiln through line 31.

Figure 4:
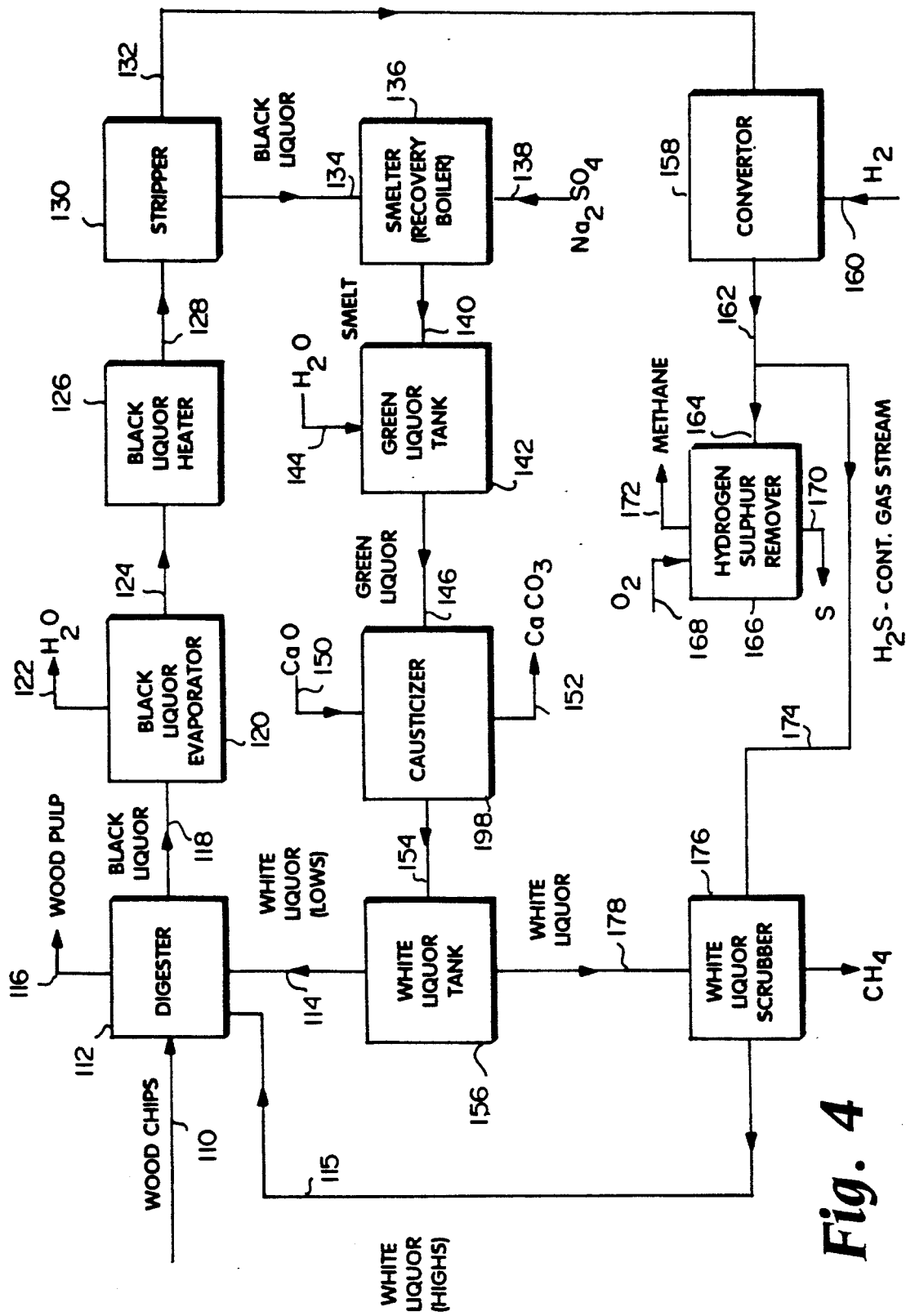
FIG. 4 is a schematic of apparatus similar to that of FIG. 1, but a slightly modified form thereof, and showing production of different sulfur content streams of white liquor.

In the embodiment of FIG. 4, wood chips or other cellulosic fibrous material is fed by line 110 to a kraft mill digester 112 wherein the wood chips are digested first by one sulfur content (e.g. low sulfidity) white liquor fed by line 114 and then by another sulfur content (e.g. high sulfidity) white liquor fed by line 115 to form wood pulp. The wood pulp is removed from the digester 112 by line 116 and forwarded for further processing, such as bleaching. The wood pulp usually is separated from the spent pulping liquor by brown stock washing (not shown).

The spent pulping liquor, or black liquor, is forwarded from the digester 112 by line 118 to a black liquor evaporator 120. The black liquor is concentrated in the evaporator 120 and steam (condensed vapor) is removed from the evaporator by line 122. The concentrated black liquor is forwarded by line 124 from the black liquor evaporator 120 to a black liquor heater 126, wherein the black liquor is heated to form substantial quantities of sulfur-bearing compounds, primarily dimethyl sulfide, but including other species, such as dimethyl sulfide, ethyl and methyl mercaptan, as well as non-sulfur-bearing substances, such as acetone, methanol, etc. The heating also results in a significant decrease in the viscosity of the black liquor, which facilitates further processing of the black liquor. A suitable procedure for effecting such heating operation is described in U.S. Pat. No. 4,929,307, the disclosure of which is incorporated by reference herein.

The resulting mixture is fed by line 128 from the heater 126 to a stripper 130, wherein the substances formed in the heating operation are stripped from the residual black liquor and removed by line 132.

The residual black liquor is forwarded by line 134 to a smelter (recovery boiler) 136, to which sodium sulphate is added by line 138 to make up sulfur losses from the system. In the smelter, the black liquor is converted to a smelt comprising mainly sodium sulfide and sodium carbonate, which is passed by line 140 to a green liquor tank 142, to which water is fed by line 144 to form green liquor from the smelt.

The green liquor then is passed by line 146 to a causticizer 150, wherein the sodium carbonate is converted to sodium hydroxide by contact with lime fed by line 150. Calcium carbonate formed in the causticizer 148 is removed as a solid phase by line 152, for passage to a lime kiln for reconversion to lime for further causticization operations. The resulting white liquor is forwarded by line 154 to a white liquor tank 156.

The stripped gases in line 132 may first be processed by removing water and non-sulfur-bearing compounds, such as by cooling and/or distillation of the gas stream to produce a water-methanol acetone stream, and the gas stream then is forwarded to a converter 158 for further processing. In the illustrated system, of a feed of 50 tons of sulfur per unit of time to the black liquor evaporator 120, approximately 15 tons of sulfur is removed as volatile material and forwarded by line 132 to the converter 158, while the remaining 35 tons of sulfur is recycled within the recovery loop.

The white liquor forwarded by line 114 to the digester 112 provides a solution of high severity but relatively low sulfidity, for example, about 20% sulfidity. This high severity liquor removes initial amounts of lignin from the wood chips fed by line 110 at a relatively rapid rate.

At the converter 158, which takes the form of a hydrotreater, hydrogen is fed by line 160 to convert all the sulfur-bearing compounds to hydrogen sulfide and those that contain methyl groups to methane. Other compounds present in the gas stream in line 132, such as methanol, also are converted to methane and water, but this conversion is not essential to the process. Standard conditions known to be practiced in the gas and petroleum processing industry may be used to effect the conversion.

The resulting gas stream, predominantly of inert gases, methane and hydrogen sulfide, is removed from the converter 158 by line 162 and split into two streams, the first stream passing by line 164 to a hydrogen sulfide removal apparatus 166, wherein the hydrogen sulfide is oxidized to sulfur by an oxygen-containing gas stream fed by line 168. Sulfur is removed by line 170. One suitable procedure for removal of hydrogen sulfide is described in U.S. Pat. No. 4,919,914 and co-pending U.S. application Ser. No. 07/622,485, now U.S. Pat. No. 5,174,973, disclosures of which are incorporated herein by reference. Methane remaining following the hydrogen sulfide removal operation may be vented by line 172 and employed as a fuel, such as for the lime kiln.

The remainder of the hydrogen sulfide-containing gas stream in line 162, generally the major proportion thereof, is forwarded by line 174 to a scrubber 176, wherein the gas stream is scrubbed by white liquor forwarded by line 178 from the white liquor tank 156.

The scrubbing operation produces a white liquor of high sulfidity for feed by line 115 to the digester 112 for use in another (the second) stage of pulping in the digester 112. The high sulfidity white liquor stream in line 115 may contain, for example, about 50% sulfidity, and provides conditions for a low severity attack on the wood chips.

The sequential digestion operation employing different sulfur content liquors (e.g. initially a low sulfidity, high severity white liquor and subsequently a high sulfidity, low severity white liquor) results in an increased yield of pulp from wood chips [e.g. of up to about 5%] and/or a significant increase in strength of pulp and/or a significant increase in delignification of the pulp.

Additional advantages of the process described with respect to FIG. 4 are:

the possibility to control sulfidity of pulping liquor much more closely and with much greater precision than has heretofore been possible, the possibility of recovering energy from the recovered methane, the possibility of employing methane as a source of hydrogen for hydrotreating using conventional reformer technology, hydrogen sulfide may be converted to elemental sulfur which is a marketable product, sodium sulfate, which currently is a limitation on the use of chlorine dioxide for pulp bleaching process, may be added to the smelter 136 for conversion to sulfur, a decrease in sulfur dioxide emission as a result of decreased sulfur feed to the smelter 136, and emissions, such as mercaptans and so on, are captured in the process and converted to sulfur, thereby decreasing environmental emissions of an odorous nature, and associated with the operation of kraft pulp mills.

The disadvantages of the need for hydrotreating converter 158, a source of hydrogen, a white liquor scrubber and a treatment process for producing the volatile sulfur compounds from black liquor are greatly outweighed by the many advantages of the process as outlined above, primarily the potential for increasing pulp yield and/or delignification and/or strength.

Figure 5:
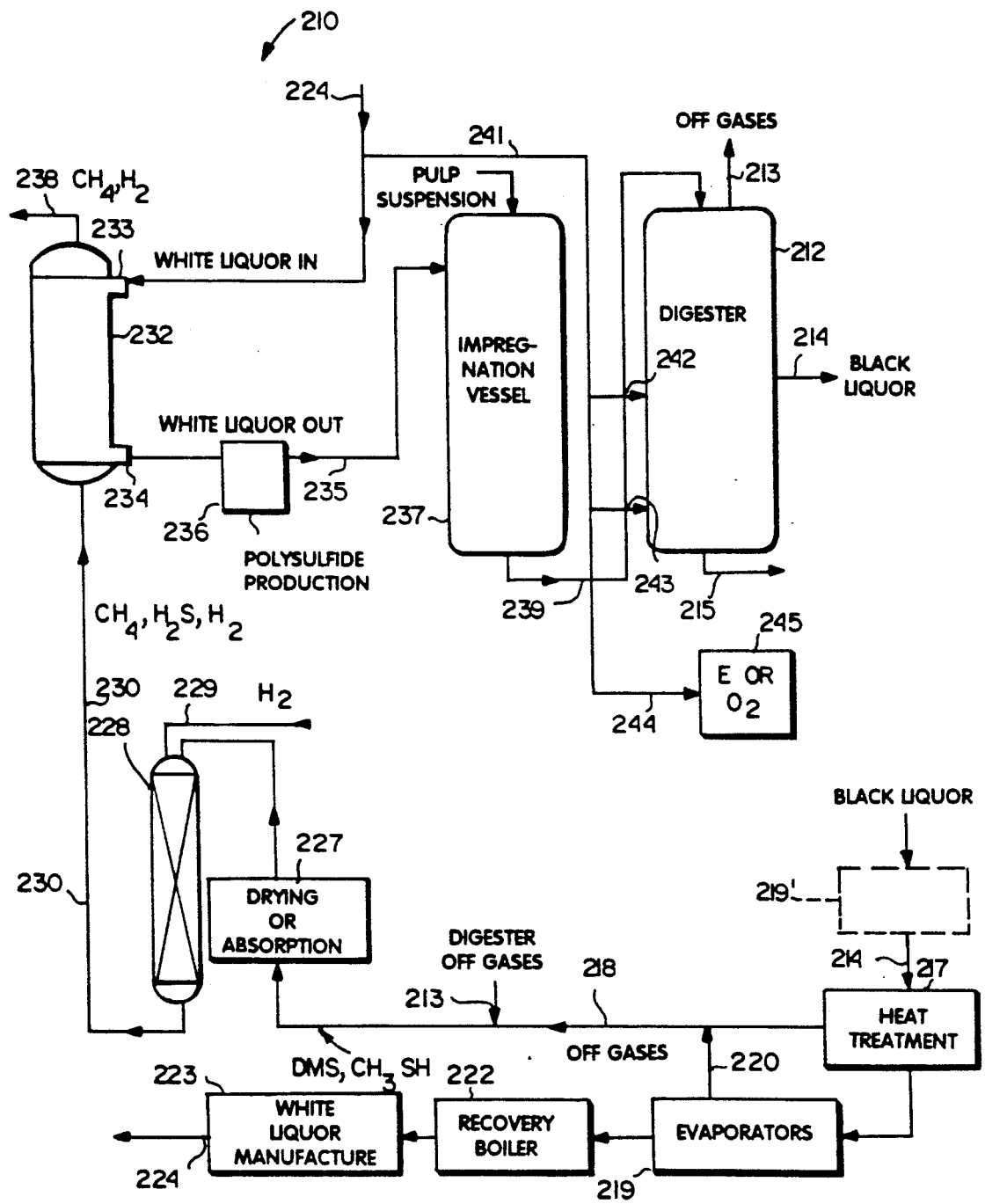
FIG. 5 is a schematic view of another form of exemplary apparatus for recovering sulfur, and for practicing an exemplary method according to the present invention using different sulfur content streams.

Another embodiment of the invention is illustrated in FIG. 5. FIG. 5 illustrates exemplary apparatus for use in a kraft pulping process, however as indicated above, the invention is applicable to other processes for the production of paper pulp from comminuted cellulosic fibrous material in which other lignin reaction enhancing or carbohydrate degradation slowing chemicals are targeted to one or more specific parts of the cook, such as the impregnation, co-current, or countercurrent stages.

In a typical kraft pulping process, as illustrated in FIG. 5, a digester 212 —which preferably is a continuous digester such as that sold by Kamyr, Inc. of Glens Falls, N.Y., but may be a batch digester —has a stream off gases 213, and black liquor (residual white liquor containing the reaction products of lignin solubilization) is withdrawn at an intermediate position as indicated at 214, while the kraft pulp produced is discharged at 215. When the black liquor in line 214 is discharged, it may be passed directly to black liquor evaporators, and preferably it is subjected, somewhere in the evaporator train, to a heat treatment process at step 217 to produce off gases in line 218. The heat treatment of block 217 is preferably that described in U.S. Pat. No. 4,929,307 (discussed above). After heat treatment at 217 the black liquor passes to evaporators 219

(evaporators 219' may concentrate the black liquor before heat treatment 217 too), which also produce off gases in line 220, then to a conventional recovery boiler 222, with conventional white liquor manufacture at block 223, to produce white liquor in line 224 having depleted sulfur content.

The off gases in line 218 —which may include only those from the heat treatment 217, or also those from the digester line 213, only, and from the black liquor evaporators in line 220, or a combination of any two of them —are preferably first subjected to a drying or absorption stage (as indicated schematically at 227 in FIG. 5) in order to remove a majority of the water vapor. The removal of the water vapor increases the concentration of organic sulfur gases. Step 227 is accomplished by drying the gas stream by any conventional means and/or by absorbing or adsorbing the organic portion of the gas onto a solid, or additionally by absorbing the off gas into one of any non-polar liquids (e.g. kerosene or mineral oil). Treatment may be provided of a liquid mixture, but preferably according to the invention further treatment is of the concentrated gas.

The next steps in the treatment of the off gases as illustrated in FIG. 5 are to add hydrogen, and then pass the gas in the presence of the added hydrogen past a hydrogen desulfurization catalyst. This may be accomplished, for example, in the hydrogen desulfurization (HDS) unit 228, with the hydrogen gas from line 229 added to the unit 228 along with the gas in line 218. The hydrogen gas in line 229 can come from any source (e.g. be purchased, from water electroylsis, etc.). It is preferred that the hydrogen desulfurization catalyst consist essentially of a transition metal-molybdenum alloy, particularly a nickel molybdenum or cobalt molybdenum alloy.

Typically, in gaseous processing, the product gas stream in line 230 is further acted upon. The gas stream in line 230 contains primarily methane, and hydrogen sulfide, with hydrogen also present. Preferably the hydrogen sulfide is then separated out from the gas in stream 230. While the hydrogen sulfide may be separated as a gas and then used in its gaseous form in conventional pulping techniques, it may be fed to a scrubber 232 in which it is brought into contact with a caustic solution, preferably kraft white liquor, which contains sodium hydroxide and most likely at least some sodium sulfide. While in the preferred embodiment illustrated in the drawings white liquor is utilized, under some circumstances green liquor may be advantageously utilized, with white liquor subsequently made from the green liquor.

White liquor from line 224 is passed into inlet 233 of scrubber 232, the hydrogen sulfide being absorbed in the white liquor and thereby significantly enhancing its sulfur content. The significantly enhanced sulfur content white liquor then passes through the outlet 234 of the scrubber into line 235, to be used in the pulping process. If desired, the white liquor in line 235 may pass through a polysulfide treatment stage, as illustrated at 236, and then to the impregnation vessel 237 (if a separate impregnation vessel is used) or the like, to be utilized in the pulping cycle. Elemental sulfur may be added at 236 instead of polysulfide.

The gas stream that remains, in line 238, contains primarily methane, but also some hydrogen. Ultimately, the gas in line 238 may become the source of the hydrogen for line 229.

According to the invention of FIG. 5, the high sulfur content white liquor in line 235 is provided at an early stage of the cook, e.g. at the beginning of the impregnation vessel 237, or impregnation stage if impregnation takes place in the digester 212 itself, or at multiple places in the impregnation zone and/or vessel 237. A countercurrent impregnation flow may be provided, in which case the higher sulfur content liquor is added near the end of the impregnation stage. Part of the sulfide depleted white liquor in line 224 is passed into line 241, and it is then introduced into the cook, preferably at multiple locations, as indicated at 242 and 243 in FIG. 5.

According to the invention, where the low sulfur content white liquor in line 241 is introduced into the kraft cook may vary widely. For example, it may be added to the middle of the impregnation vessel 237, at one, two, or more co-current stages in the digester 212, or at one, two, or more countercurrent stages in the digester 212 (e.g. for Kamyr, Inc. modified continuous cooking, or extended modified continuous cooking). Of course, the liquor in line 241 may also be utilized in a batch process.

While the drawing illustrates only two streams or supplies of white liquor, 235, 241, having different sulfur content, as many different sulfur content streams as desired may be produced. For example two series connected units 232 may be utilized, the first producing the highest sulfur content level white liquor, while the second produces an intermediate (between lines 235 and 241) sulfur content level white liquor. The intermediate sufidity white liquor is added earlier in the cook than the white liquor in line 241.

The relative amount of sulfur content of the white liquor added at various stages within the kraft cycle may also be varied widely according to the invention. For example, if the kraft pulping process is to be a multilevel conventional cook, that is white liquor is added at two or more points in the cook and flows co-currently with the pulp, then about 60% of the total cooking chemical is added to the impregnation vessel (e.g. in line 235), while about 25% is added to the first co-current stage (e.g. at 242) and about 15% to the second co-current stage (e.g. at 243). In this procedure, preferably the amount of sulfide provided in line 235 is about 60–90%, and if practical may be almost 100% of the total sulfide in all of the white liquor streams, that is the white liquor in stream 241 is substantially fully sulfide depleted. The stream in line 235 in this embodiment may be made by passing 35–65% of the total volume of white liquor through the unit 232, the remaining 65–35% of the white liquor being added through line 241. According to another embodiment, about 35% of the total volume of white liquor is passed through unit 232, and this high sulfur content white liquor is then added to the top circulation in the conventional impregnation vessel 237. The sulfide-depleted white liquor in line 241 is added to middle circulation in the vessel 237 in the amount of about 25–35% of the total cooking chemical from white liquor, while about 20–25% of the total cooking chemical, in the sulfide depleted white liquor in line 241, is added to the continuous digester 212 first cooking circulation.

The low sodium sulfide content liquor in line 241 may also be added at 244 to an oxygen delignification or bleaching stage 245 as a source of sodium hydroxide.

White liquor streams having different sulfur contents are utilized according to the invention, the total amount of sulfur is not changed compared to the prior art. It is not necessary to significantly disturb the sulfur balance in a pulp mill in the practice of the invention.

When utilizing the multiple level sulphitiy white liquors according to the invention in modified continuous cooking and extended modified continuous cooking sequences, the viscosity to kappa ratio may be increased by about 0.2-0.3 units if almost all sulfide is added to the impregnation stage (e.g. in line 235 to vessel 237). Preferably at least about 60% (e.g. 60-90%) of the total sulfur content is added in the impregnation stage (line 235), the total volume of white liquor added in line 235 being about 40-65% of the total volume of white liquor used in the pulping process.

In stage 236, polysulfide is added to the white liquor. For example, this can be done by the MOXY (TM) process in which some of the sodium sulfide in the white liquor is partially oxidized to produce polysulfide, or by other known polysulfide processes. Alternatively, in stage 236 polysulfide from an external source may merely be introduced into the white liquor, e.g. polysulfide produced by reacting elemental sulfur with sulfide ions in an aqueous solution under proper conditions; or elemental sulfur may be added to the white liquor instead of polysulfide.

The amount of polysulfide produced, or added, in stage 236 may be about 0.5%-8% on wood, expressed as elemental sulfur. Typically, about 2% polysulfide is desirable. If 2% polysulfide is used in conjunction with extended modified continuous cooking, a kraft pulp with a kappa of about 12.5, a viscosity of about 33.7 cp, and a yield of about 44.6% can be made. This yield is equal to that of a conventional cook or extended modified continuous cook pulp at a kappa of about 18-20 without polysulfide, and the viscosity is equivalent to that of a conventional cook pulp at kappa 26, or an extended modified continuous cook pulp at kappa 17.

If an amount of elemental sulfur equivalent to about 0.5-8% polysulfide is used, the results are about 60-75% as good as when polysulfide is used.

Utilizing the apparatus schematically illustrated in the drawings, various methods may be practiced according to the invention. According to one method the following steps are practiced:

(a) Two (or more) streams of white liquor, 235, 241, are made up, the first stream (235) having relatively high sulfur content, and the second (241) relatively low sulfur content (even approaching zero).

(b) Cellulosic comminuted fibrous material (e.g. wood chips) are impregnated with the first stream 235 (e.g. in vessel 237).

(c) The material is cooked under kraft cooking conditions, in a cooking zone (in vessel 212) with cooking chemicals (the sodium hydroxide and sodium sulfide in the white liquor) to produce kraft pulp.

(d) The second stream, 241, of white liquor is supplied to the cooking zone (e.g. digester 212) as cooking chemicals; and (e) the kraft pulp is washed (e.g. in a wash zone in digester 212, and/or in a separate wash vessel).

According to another aspect of the invention, a slurry of wood chips is treated in a plurality of consecutive stages (e.g. impregnation stage, first and second co-current or countercurrent cooking stages) with white liquor using first and second supplies, differing in the sulfur content thereof. The chips are treated with white liquor under cooking conditions (e.g. in digester 212) in at least one stage, to effect kraft cooking thereof. Black liquor is withdrawn (at 214) and sulfur is recovered from the black liquor, as by treating it (at 217) according to the process of U.S. Pat. No. 4,929,307, evaporating it (in 219), etc. (see 222 and 223 in FIG. 5). The recovered sulfur is added to the first supply of white liquor, as in unit 232, to significantly increase the sulfur content thereof, so that the sulfur content of the liquor in line 235 is substantially greater than that in line 241 (which is sulfur depleted, and may be near zero). The relative sulfur contents of the white liquors in lines 235 and 241 are controlled so as to optimize the viscosity/kappa ratio and/or physical strength properties.

The invention allows advantageous production of kraft pulp to be practiced on an industrial scale—that is, larger production than reasonably possible in a laboratory—with complete chemical recovery, and without requiring added sulfur, maintaining a suitable sulfur balance in a mill.

The invention may be illustrated by various examples.

Tables IA-IE provide the results of laboratory batch cooks using split white liquor streams with variable sulfur content, according to the invention, and conventional cooks for comparison purposes. In these tables, "CK" means conventional kraft cooking; "MCK" means kraft cooking with multiple introductions of white liquor, with more than one co-current cooking stage; "MCC" refers to Kamyr, Inc.'s trademarked modified continuous cooking process in which multiple introductions of white liquor are provided, and a countercurrent cook stage; and "EMCC" refers to Kamyr, Inc.'s trademarked extended modified continuous cooking process in which a second countercurrent cook is provided.

Table II illustrates the advantages achieved when polysulfide is used. The liquid to wood ratio for all cooks in Table II is 4/1. "Sulfidity" refers to sodium sulfide content.

The wood utilized in all of TABLES IA-E and II is southern pine from the Mississippi area. However, the results are applicable to a wide variety of wood species.

TABLE IA

| Cook number | CONVENTIONAL KRAFT (CK) | | | | SPLIT WL WITH VARIABLE SULFIDITY (MCK) | | | | | | |
|---|---|---|---|---|---|---|---|---|---|---|---|
| | A2797 | A2798 | A2800 | A2805 | A2793 | A2801 | A2794 | A2802 | A2821 | A2807 | A2856 |
| Type | CK | CK | CK | CK | MCK | MCK | MCK | MCK | MCK | MCK | MCK |
| Total EA, % Na2O | 14.5 | 14.5 | 16.0 | 16.0 | 14.5 | 16.0 | 14.5 | 16.0 | 16.0 | 16.0 | 16.0 |
| Impregnation | 14.5 | 14.5 | 16.0 | 16.0 | 8.7 | 9.6 | 8.7 | 9.6 | 9.6 | 9.6 | 9.6 |
| 1st co-current | — | — | — | — | 3.6 | 4.0 | 3.6 | 4.0 | 4.0 | 4.0 | 4.0 |
| 2nd co-current | — | — | — | — | 2.2 | 2.4 | 2.2 | 2.4 | 2.4 | 2.4 | 2.4 |
| Overall sulfidity, % | 35.2 | 30.2 | 30.2 | 30.0 | 30.0 | 30.0 | 30.0 | 30.0 | 30.1 | 30.2 | 30.2 |
| Impregation | 35.2 | 30.2 | 302. | 30.0 | 30.0 | 30.0 | 20.0 | 20.0 | 36.9 | 36.9 | 43.7 |
| 1st co-current | — | — | — | — | 30.0 | 30.0 | 60.0 | 61.0 | 20.2 | 20.2 | 10.0 |
| 2nd co-current | — | — | — | — | 30.0 | 30.0 | 20.0 | 20.0 | 20.2 | 20.2 | 10.0 |
| Screened yield, % | 47.3 | 47.4 | 46.3 | 45.4 | 48.3 | 46.5 | 47.9 | 46.2 | 46.7 | 46.3 | 46.4 |
| Kappa number | 29.3 | 34.2 | 26.7 | 23.1 | 39.8 | 28.5 | 39.6 | 28.2 | 26.5 | 25.9 | 25.6 |

TABLE IA-continued

| | CONVENTIONAL KRAFT (CK) | | | | SPLIT WL WITH VARIABLE SULFIDITY (MCK) | | | | | | |
|---|---|---|---|---|---|---|---|---|---|---|---|
| Cook number | A2797 | A2798 | A2800 | A2805 | A2793 | A2801 | A2794 | A2802 | A2821 | A2807 | A2856 |
| Type | CK | CK | CK | CK | MCK | MCK | MCK | MCK | MCK | MCK | MCK |
| Viscosity, cp | 42.7 | 42.3 | 31.2 | 30.3 | 49.0 | 35.9 | 43.9 | 37.6 | 37.1 | 42.4 | 37.4 |
| Viscosity/kappa | 1.46 | 1.24 | 1.17 | 1.31 | 1.23 | 1.26 | 1.11 | 1.33 | 1.40 | 1.64 | 1.46 |
| Average v/k | — | | 1.24 | | 1.25 | | 1.22 | | 1.52 | | 1.50 |
| Std deviation | — | | 0.07 | | 0.02 | | 0.16 | | 0.17 | | 0.05 |

Note:
All CK cooks had a 4.5 L/W ratio, and all MCK cooks had a 3.1 initial and a 4.5 final L/W ratio. White liquor split pattern with all MCK cooks was 60% of total in the impregnation, 25% in the first cooking stage, and 15% in the second cooking stage.

TABLE IB

| | SPLIT WL WITH VARIABLE SULFIDITY (MCK) | | | | | | | | | | |
|---|---|---|---|---|---|---|---|---|---|---|---|
| Cook number | A2843 | A2857 | A2844 | A2836 | A2847 | A2795 | A2803 | A2796 | A2804 | A2806 | A2808 |
| Type | MCK | MCK | MCK | MCK | MCK | MCK | MCK | MCK | MCK | MCK | MCK |
| Total EA, % Na2O | 16.0 | 16.0 | 16.0 | 16.0 | 16.0 | 14.5 | 16.0 | 14.5 | 16.0 | 16.0 | 16.0 |
| Impregnation | 9.6 | 9.6 | 9.6 | 9.6 | 9.6 | 8.7 | 9.6 | 8.7 | 9.6 | 9.6 | 9.6 |
| 1st co-current | 4.0 | 4.0 | 4.0 | 4.0 | 4.0 | 3.6 | 4.0 | 3.6 | 4.0 | 4.0 | 4.0 |
| 2nd co-current | 2.4 | 2.4 | 2.4 | 2.4 | 2.4 | 2.2 | 2.4 | 2.2 | 2.4 | 2.4 | 2.4 |
| Overall sulfidity, % | 29.9 | 30.0 | 30.1 | 37.4 | 37.5 | 37.5 | 37.5 | 37.5 | 37.5 | 37.5 | 37.5 |
| Impregation | 43.2 | 50.0 | 50.1 | 37.5 | 37.5 | 30.0 | 30.0 | 42.5 | 42.5 | 42.5 | 49.2 |
| 1st co-current | 9.9 | 0.0 | 0.0 | 37.5 | 37.5 | 61.0 | 61.0 | 30.0 | 30.0 | 30.0 | 20.0 |
| 2nd co-current | 9.9 | 0.0 | 0.0 | 37.5 | 37.5 | 30.0 | 30.0 | 30.0 | 30.0 | 30.0 | 20.0 |
| Screened yield, % | 46.4 | 46.2 | 46.6 | 46.6 | 46.6 | 48.0 | 46.1 | 47.4 | — | 46.0 | 46.0 |
| Kappa number | 25.5 | 24.1 | 25.5 | 25.5 | 25.2 | 35.6 | 24.9 | 35.0 | 24.5 | 22.5 | 22.1 |
| Viscosity, cp | 39.2 | 39.9 | 40.7 | 37.6 | 40.7 | 49.3 | 38.4 | 55.1 | 34.7 | 37.5 | 34.1 |
| Viscosity/kappa | 1.54 | 1.66 | 1.60 | 1.47 | 1.62 | 1.38 | 1.54 | 1.57 | 1.42 | 1.67 | 1.54 |
| Average v/k | | 1.63 | | | 1.54 | | | 1.46 | | 1.55 | 1.61 |
| Std deviation | | 0.04 | | | 0.10 | | | 0.11 | | 0.13 | 0.09 |

TABLE IC

| Cook number | A2824 | A2845 | A2859 | A2860 | A2846 | A2837 | A2848 | A2871 | A2849 | A2838 | A2850 |
|---|---|---|---|---|---|---|---|---|---|---|---|
| Type | MCK | MCK | MCK | MCK | MCK | MCK | MCK | MCK | MCK | MCK | MCK |
| Total EA, % Na2O | 16.0 | 16.0 | 16.0 | 16.0 | 16.0 | 16.0 | 16.0 | 16.0 | 16.0 | 16.0 | 16.0 |
| Impregnation | 9.6 | 9.6 | 9.6 | 9.6 | 9.6 | 9.6 | 9.6 | 9.6 | 9.6 | 9.6 | 9.6 |
| 1st co-current | 4.0 | 4.0 | 4.0 | 4.0 | 4.0 | 4.0 | 4.0 | 4.0 | 4.0 | 4.0 | 4.0 |
| 2nd co-current | 2.4 | 2.4 | 2.4 | 2.4 | 2.4 | 2.4 | 2.4 | 2.4 | 2.4 | 2.4 | 2.4 |
| Overall sulfidity, % | 37.5 | 27.3 | 27.4 | 27.6 | 37.7 | 45.3 | 45.0 | 45.4 | 45.1 | 44.8 | 45.2 |
| Impregation | 49.3 | 55.6 | 55.6 | 62.6 | 62.8 | 45.3 | 45.0 | 45.4 | 55.3 | 54.7 | 61.9 |
| 1st co-current | 20.2 | 9.9 | 10.0 | 0.0 | 0.0 | 45.3 | 45.0 | 45.4 | 29.9 | 29.9 | 20.2 |
| 2nd co-current | 20.2 | 9.9 | 10.0 | 0.0 | 0.0 | 45.3 | 45.0 | 45.4 | 29.9 | 29.9 | 20.2 |
| Screened yield, % | 46.1 | 46.3 | 46.3 | 46.1 | 46.2 | 46.5 | 46.3 | 44.9 | 46.1 | 46.2 | 46.2 |
| Kappa number | 22.9 | 23.4 | 23.0 | 22.2 | 22.8 | 23.2 | 22.8 | 23.5 | 21.9 | 22.0 | 21.8 |
| Viscosity, cp | 38.2 | 39.5 | 39.5 | 48.1 | 39.5 | 36.4 | 39.8 | 38.6 | 38.0 | 41.5 | 41.4 |
| Viscosity/kappa | 1.67 | 1.69 | 1.72 | 2.17 | 1.73 | 1.57 | 1.74 | 1.64 | 1.74 | 1.89 | 1.90 |
| Average v/k | | 1.70 | | 1.95 | | | 1.65 | | 1.81 | | 1.94 |
| Std deviation | | 0.02 | | 0.31 | | | 0.09 | | 0.11 | | 0.06 |

TABLE ID

| | VARIABLE SULFIDITY MCC | | | | | | | VARIABLE SULFIDITY EMCC | | |
|---|---|---|---|---|---|---|---|---|---|---|
| Cook number | A2839 | A2854 | A2852 | A2861 | 2855 | 2853 | A2858 | A2862 | A2867 | A2864 |
| Type | MCK | MCC | MCC | MCC | MCC | MCC | MCC | EMCC | EMCC | EMCC |
| Total EA, % Na2O | 16.0 | 19.5 | 20.1 | 20.1 | 20.1 | 20.2 | 19.8 | 23.6 | 23.6 | 23.6 |
| Impregnation | 9.6 | 10.1 | 10.1 | 10.1 | 10.1 | 10.1 | 10.1 | 8.5 | 3.1 | 3.1 |
| 1st co-current | 4.0 | 3.1 | 3.1 | 3.1 | 3.1 | 3.9 | 3.1 | 3.1 | 3.1 | 3.1 |
| 2nd co-current | 2.4 | 6.3 | 6.9 | 6.9 | 6.9 | 6.3 | 6.6 | 11.9 | 11.9 | 11.9 |
| Overall sulfidity, % | 45.3 | 30.4 | 30.0 | 30.0 | 37.4 | 37.6 | 37.6 | 29.9 | 30.2 | 30.5 |
| Impregation | 62.1 | 30.4 | 50.0 | 50.0 | 37.5 | 62.7 | 62.6 | 30.0 | 50.4 | 50.9 |
| 1st co-current | 20.0 | 30.4 | 0.0 | 0.0 | 37.5 | 0.0 | 0.0 | 30.0 | 0.0 | 0.0 |
| 2nd co-current | 20.0 | 30.1 | 0.0 | 0.0 | 37.0 | 0.0 | 0.0 | 29.0 | 0.0 | 0.0 |
| Screened yield, % | 46.1 | 45.4 | 44.5 | 44.7 | 44.9 | 43.5 | 44.4 | 44.4 | 43.3 | 43.3 |
| Kappa number | 21.8 | 28.3 | 23.1 | 24.0 | 22.3 | 19.1 | 20.4 | 22.1 | 21.5 | 19.6 |
| Viscosity, cp | 43.4 | 37.2 | 38.4 | 37.8 | 37.4 | 35.5 | 35.4 | 42.3 | 47.9 | 45.4 |
| Viscosity/kappa | 1.99 | 1.31 | 1.66 | 1.57 | 1.67 | 1.86 | 1.74 | 1.91 | 2.23 | 2.32 |
| Average v/k | | — | 1.62 | | — | 1.80 | | — | 2.27 | |
| Std deviation | | — | 0.06 | | — | 0.09 | | — | 0.07 | |

TABLE IE

| Cook number Type | A2863 EMCC | A2868 EMCC | A2866 EMCC | A2872 EMCC | A2877 EMCC | A2878 EMCC |
|---|---|---|---|---|---|---|
| Total EA, % Na2O | 23.6 | 23.6 | 23.6 | 23.6 | 23.6 | 23.6 |
| Impregnation | 8.5 | 8.5 | 8.5 | 8.5 | 8.5 | 8.5 |
| 1st co-current | 3.1 | 3.1 | 3.1 | 3.1 | 3.1 | 3.1 |
| 2nd co-current | 11.9 | 12.0 | 11.9 | 12.0 | 12.0 | 11.9 |
| Overall sulfidity, % | 37.4 | 37.6 | 37.6 | 37.6 | 45.3 | 45.1 |
| Impregation | 37.6 | 62.6 | 62.7 | 62.7 | 45.4 | 75.2 |
| 1st co-current | 37.6 | 0.0 | 0.0 | 0.0 | 45.4 | 0.0 |
| 2nd co-current | 36.5 | 0.0 | 0.0 | 0.0 | 44.6 | 0.0 |
| Screened yield, % | 43.9 | 44.0 | 43.3 | 44.4 | 44.6 | 44.9 |
| Kappa number | 19.8 | 18.8 | 19.9 | 17.7 | 19.0 | 19.0 |
| Viscosity, cp | 44.2 | 46.2 | 46.3 | 43.5 | 42.8 | 48.6 |
| Viscosity/kappa | 2.23 | 2.46 | 2.33 | 2.46 | 2.25 | 2.56 |
| Average v/k | — | 2.42 | — | — | — | — |
| Std deviation | — | 0.08 | — | — | — | — |

TABLE II

Polysulfide Pulping Study

| Cook number Type | A2963 EMCC | A2958 EMCC | A2961 EMCC | A2964 EMCC | A2962 EMCC | A2959 MCK | A2965 MCK | A2960 MCK |
|---|---|---|---|---|---|---|---|---|
| Polysulfide, % on o.d. wood | 0 | 2 | 2 | 2 | 3 | 2 | 2 | 3 |
| Presteaming | | | | | | | | |
| Time, min | 5 | 5 | 5 | 5 | 5 | 5 | 5 | 5 |
| Temperature, °C. | 110 | 110 | 110 | 110 | 110 | 110 | 110 | 110 |
| Impregnation | | | | | | | | |
| Time, min | 30 | 30 | 30 | 30 | 30 | 30 | 30 | 30 |
| Temperature, °C. | 110 | 110 | 110 | 110 | 110 | 110 | 110 | 110 |
| Pressure, psig | 150 | 150 | 150 | 150 | 150 | 150 | 150 | 150 |
| Initial EA, % NaOH | 12 | 16 | 12 | 13 | 13 | 14.7 | 14.7 | 16.3 |
| Initial EA, % Na2O | 9.3 | 12.4 | 9.3 | 10.1 | 10.1 | 11.4 | 11.4 | 12.6 |
| Sulfidity, % on AA | 62.8 | 73.6 | 62.5 | 62.5 | 62.5 | 62.5 | 62.5 | 62.5 |
| 2nd EA @ 5 min, % NaOH | 2 | 2 | 2 | 2 | 2 | — | — | — |
| Residual EA, g/L Na2O | 14.1 | 22.0 | 13.6 | 15.0 | 14.4 | 15.9 | 15.4 | 15.7 |
| Resid. polysulfide, g/L S° | — | 1.6 | 1.6 | 1.6 | 2.9 | 1.9 | 1.5 | 2.6 |
| Cocurrent Stage | | | | | | | | |
| Total time, min | 60 | 60 | 61 | 60 | 60 | 73 | 75 | 75 |
| Max temperature, °C. | 165 | 165 | 164 | 164 | 164 | 170 | 170 | 170 |
| Time at max, min | 45 | 45 | 45 | 45 | 45 | 45 | 45 | 45 |
| EA, % NaOH | 5 | 5 | 5 | 6 | 6 | 6.1 | 6.1 | 6.8 |
| EA, % Na3O | 3.9 | 3.9 | 3.9 | 4.7 | 4.7 | 4.8 | 4.75 | 5.25 |
| Sulfidity, % | 0 | 0 | 0 | 0 | 0 | 0 | 0 | 0 |
| Residual EA, g/L Na2O | 12.0 | 14.0 | 8.5 | 9.7 | 8.0 | 10.2 | — | 9.6 |
| Cocurrent Stage II | | | | | | | | |
| Time, min | — | — | — | — | — | 135 | 104 | 72 |
| Temperature, °C. | — | — | — | — | — | 170 | 170 | 170 |
| EA, % Na2O | — | — | — | — | — | 2.85 | 2.85 | 3.15 |
| Sulfidity, % | — | — | — | — | — | 0 | 0 | 0 |
| Countercurrent Stage | | | | | | | | |
| Time, min | 240 | 240 | 240 | 240 | 240 | — | — | — |
| Temperature, °C. | 165 | 160 | 164 | 164 | 164 | — | — | — |
| EA, % NaOH on wood | 15.4 | 15.4 | 15.3 | 15.4 | 15.4 | — | — | — |
| Sulfidity, % | 0 | 0 | 0 | 0 | 0 | — | — | — |
| EA, g/L as NaOH | 12.0 | 12.0 | 11.9 | 12.0 | 12.0 | — | — | — |
| Displacement, L/min. | 0.16 | 0.16 | 0.16 | 0.16 | 0.16 | — | — | — |
| Displaced volume, L | 38.4 | 38.4 | 38.4 | 38.4 | 38.4 | — | — | — |
| Displacement Residual: | | | | | | | | |
| @ 60 minutes, EA g/L Na2O | 8.8 | 10.4 | 6.9 | 7.9 | 6.6 | — | — | — |
| @ 120 minutes, EA g/L Na2O | 8.3 | 9.1 | 7.6 | 7.7 | 7.1 | — | — | — |
| Tot. Composite, EA g/L Na2O | 9.3 | 9.6 | 7.3 | 7.9 | 7.3 | — | — | — |
| End of Cook | | | | | | | | |
| Residual EA, g/L NaOH | 10.9 | 10.0 | 10.0 | 10.2 | 9.8 | 12.4 | 10.9 | 13.4 |
| g/L Na2O | 8.4 | 7.8 | 7.7 | 7.9 | 7.6 | 9.6 | 8.5 | 10.4 |
| H-factor | 2927 | 2239 | 2733 | 2690 | 2695 | 2947 | 2459 | 1935 |
| Unbleached Pulp | | | | | | | | |
| Total yield, % | 42.8 | 44.6 | 45.5 | 45.1 | 45.9 | 43.5 | 44.9 | 45.6 |
| Rejects, % | <0.01 | <0.01 | 0.02 | <0.01 | <0.01 | <0.01 | <0.01 | <0.02 |
| Screened yield, % | 42.8 | 44.6 | 45.5 | 45.1 | 45.9 | 43.5 | 44.9 | 45.6 |
| Kappa, unscreened | — | 12.4 | 17.1 | 14.6 | 15.1 | 11.7 | 15.0 | 15.6 |
| Kappa, screened | 14.0 | 12.6 | 16.9 | 15.1 | 15.0 | 11.7 | 14.6 | 14.6 |
| Kappa, screened (test 2) | 13.8 | 12.4 | 16.8 | 15.1 | 14.7 | 11.7 | 14.4 | 14.4 |
| Viscosity, 0.5% CED, cp | 32.2 | 33.7 | 42.4 | 42.2 | 42.1 | 23.6 | 29.3 | 32.3 |
| Viscosity, (test 2) | 30.0 | 34.5 | 43.7 | 41.9 | 41.5 | 22.0 | 28.0 | 32.4 |
| V/K, (test 1) | 2.30 | 2.67 | 2.51 | 2.79 | 2.81 | 2.02 | 2.01 | 2.21 |

Note:
Liquid to wood ratio was 4/1 for EMCC cooks and 4.5/1 for MCK cooks.

As can be seen from the above examples, the method according to the invention optimizes the viscosity/kappa ratio and/or strength properties of kraft pulp produced, and achieves other advantageous results. The utilization of polysulfide or elemental sulfur as part of the sulfide content of the white liquor also significantly increases yield.

While the Tables describe the results of kraft cooks with white liquor, the invention is applicable to other cooking processes and cooking liquors for the production of paper pulp. With sulfite cooking liquor, and when using other lignin reaction enhancing or carbohydrate degradation slowing chemicals, such as anthraquinone or its derivatives or equivalents, or the like, significant increases in viscosity/kappa ratio or pulp strength properties can be obtained by targeting one cooking liquor to a specific stage (or stages) of the cook, while another cooking liquor is used in other portions.

In general, a method is provided in which comminuted cellulosic fibrous material is treated with cooking liquor to obtain cellulosic pulp in the following steps: (a) Providing at least first and second cooking liquors, including a first cooking liquor having a first concentration of lignin enhancing or carbohydrate degradation slowing chemical (e.g. in line 235), and a second cooking liquor (e.g. in line 241) having a second concentration of that lignin enhancing or carbohydrate degradation slowing chemical, the second concentration being from zero to much less than the first concentration. (b) Cooking the comminuted cellulosic fibrous material in several cook stages (e.g. in vessels 212, 237). (c) Targeting the first cooking liquor to one or more, but less than all, of the cook stages, to provide cooking liquor for that one or more stages (e.g. to the co-current impregnation stage in vessel 237). And (d) utilizing the second cooking liquor in at least one cook stage in which the first cooking liquor is not utilized (e.g. introducing it at 242, 243 into co-current or countercurrent cook stages).

While the invention has been herein shown and described in what is presently conceived to be the most practical embodiment thereof, it will be appreciated by those in the art that many modifications may be made thereof within the scope of the invention, which scope is to be accorded the broadest interpretation of the appended claims so as to encompass all equivalent methods and procedures.

What is claimed is:

1. A method of producing kraft pulp by cooking comminuted cellulosic fibrous material with white liquor to produce kraft pulp and black liquor, comprising the steps of:
   (a) treating a slurry of cellulosic fibrous material in a plurality of consecutive stages with white liquor, including at least first and second stages, using a first supply of white liquor on the first stage and a second supply of white liquor on another stage;
   (b) subjecting the material treated with white liquor to cooking conditions in at least one of the stages to effect kraft cooking thereof, and producing black liquor;
   (c) removing and treating sulfur from the black liquor and making at least two streams of white liquors from the remaining black liquor, and wherein the second stream of white liquor is used as the second supply of white liquor;
   (d) adding the treated sulfur to the first stream of white liquor to produce the first supply of white liquor with a sulfur content greater than the sulfur content of the second supply of white liquor; and
   wherein steps (a), (c) and (d) are practiced by: (i) pressure heating the black liquor at a temperature and for a time period such that substantial volumes of off gases containing organic sulfur compounds are produced; (ii) treating the off gases from step (i) to produce primarily hydrogen sulfide and methane; and (iii) using the hydrogen sulfide to produce the first supply of white liquor.

2. A method as recited in claim 1 wherein step (a) is practiced to add the first supply of white liquor to the first stage, and the second supply of white liquor to the second stage.

3. A method as recited in claim 1 wherein sub-step (iii) is practiced by absorbing the hydrogen sulfide into a stream of white liquor.

4. A method as recited in claim 1 wherein sub-step (i) is practiced by heating the black liquor at a pressure of between about 8–165 bars at a temperature of about 170°–350° C. for about 1–60 minutes.

* * * * *

UNITED STATES PATENT AND TRADEMARK OFFICE
CERTIFICATE OF CORRECTION

PATENT NO. : 5,326,433
DATED       : July 5, 1994
INVENTOR(S) : Ryham et al.

It is certified that error appears in the above-identified patent and that said letters patent is hereby corrected as shown below:

On the title page, under item [75] Inventors, delete Jian E. Jiang of Glen Falls, N.Y. and Kaj Henricson of Kotka, Finland.

Signed and Sealed this

Twenty-third Day of May, 1995

Attest:

BRUCE LEHMAN

*Attesting Officer*  *Commissioner of Patents and Trademarks*